United States Patent Office 2,784,166
Patented Mar. 5, 1957

2,784,166

LIQUID COMPOSITIONS COMPRISING A NITROGENOUS POLYMER

Henry P. Wohnsiedler, Darien, Conn., and Edward L. Kropa, Columbus, Ohio, assignors to American Cyanamid Company, New York, N. Y., a corporation of Maine No Drawing. Application February 5, 1954, Serial No. 408,574

17 Claims. (Cl. 260—29.2)

This invention relates broadly to new and useful liquid compositions comprising a nitrogenous polymer. More particularly the invention is concerned with liquid compositions comprising, by weight, (1) a major proportion (that is, more than 50%) of water and (2) a minor proportion (that is, less than 50%) of a polymer obtained by polymerizing, in acidic water, a polyethylene melamine which is a polyamino-s-triazine wherein at least two of the amino nitrogen atoms each has one ethylene group attached thereto instead of the two hydrogen atoms. By this definition of "a polyethylene melamine" is meant specifically diethylene melamine, the formula for which is

I

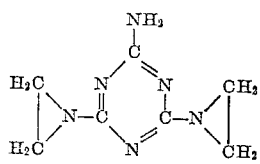

and triethylene melamine, the formula for which is

II

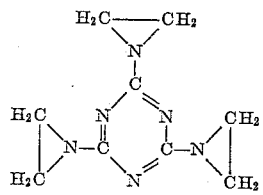

Both diethylene melamine and triethylene melamine are known compounds, and methods for their preparation and their characteristic properties are described in the prior art, e. g., in Patent Nos. 2,520,619 and 2,653,934.

It was suggested prior to our invention that triethylene melamine be used as a textile-treating agent, for which, "if capable of being stabilized in monomeric form," the following advantages were claimed (reference: "Synthetic Fiber Developments in Germany," P. B. 7416. Report prepared by the synthetic Fibers Team of the Technical Industrial Intelligence Committee, compiled and edited by Le Roy H. Smith, published in 1946 by Technical Research Institute, Inc., New York, pages 28, 29, 876 and 877):

"1. Polymerizes at 70° C.
2. Due to low polymerization temperature there is no wicking.
3. Accordingly, it is applicable to fiber as well as fabric.
4. Produces a non-swelling fiber.
5. Gives good wet strengths to the fabric.
6. Gives nonshrinking effect.
7. Gives improved resistance to alkali solubility and to laundering.
8. Improves dye affinity and gives better light fastness and wash fastness.
9. Probably can go to a very low swelling fiber without lowering abrasion resistance.
10. Water stable impressions can be made for novelty effects such as crepes.
11. Imparts resilience and good handle to fiber and fabric."

On page 876 of this same publication it is further stated with regard to triethylene melamine: "This product polymerizes readily at 70° C. before moisture is evaporated . . . One feature not sufficiently established is whether the monomer can be established in a practical way." By this latter comment was meant that was not known if triethylene melamine was sufficiently stable to storage to be commercially practicable.

To the best of our knowledge and belief a polyethylene melamine, specifically triethylene melamine, was not used in commercial practice as a textile-treating agent prior to our invention despite the aforementioned advantages of the material. Although high cost may have been one important factor which contributed to its non-commercial exploitation and use, our experience has indicated that another important factor was the difficulty in obtaining solutions of the monomer which would have adequate storage stability and which could be inhibited against premature polymerization so that uniform finishes could be applied to the textile material to be treated.

The present invention is based on our discovery that the aforementioned advantages flowing from the use of solutions of monomeric polyethylene melamine, specifically monomeric diethylene melamine and triethylene melamine, can be attained and the problem of storage instability of such solutions until used, or the necessity of adding a polymerization inhibitor thereto, can be obviated by forming liquid compositions of the kind broadly described in the first paragraph of this specification and more fully hereafter.

The liquid compositions of this invention are produced by admixing (1) acidic water and (2) diethylene melamine or triethylene melamine, or mixtures of diethylene melamine and triethylene melamine in any proportions, and polymerizing the polyethylene melamine or melamines of (2) while admixed with the acidic water of (1). If the liquid compositions as initially produced are not constituted of, by weight, a major proportion of water and a minor proportion of a polymer obtained by polymerizing in acidic water the polyethylene melamine or melamines of (2), they are adjusted so that they are so constituted after initial preparation of the polymer in the acidic water. This adjustment may take place at any suitable time prior to use of the material, for instance either immediately after preparation, or after a filtering step prior to shipment by the manufacturer or shipper to the user, or shortly before being used. The solution is adjusted, if necessary, prior to use to the pH conditions which give optimum results when the solution is applied to the textile or other material to be treated.

We are unable to explain with certainty with a polyethylene melamine when polymerized in acidic water should yield a solution which is relatively stable on storage, that is, as compared with corresponding solutions of monomeric polyethylene melamine, while at the same time providing a solution which, when used as a textile-treating agent, paper-treating agent and in other applications, gives beneficial results and advantages which, it was believed prior to our invention, could be obtained only from the use of a solution of a monomeric polyethylene melamine, specifically monomeric triethylene melamine. One possible explanation is that the polymer produced in this way is of the linear type and is water-soluble, or if not water-soluble then it is at least readily water-dispersible to form particles of colloidal or near-colloidal size or nature. One possible and logical theoretical explanation for the formation of such a polymer is shown by the following equations, taking triethylene melamine as illustrative of the polyethylene melamine employed:

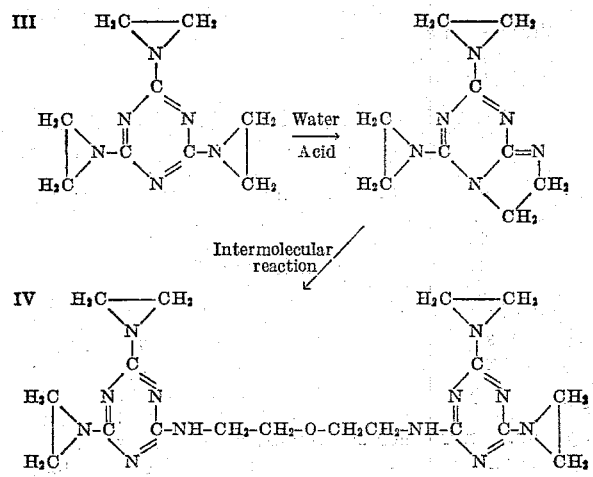

For purpose of simplicity Equation IV has been written to show merely the dimer as the polymer which is formed, but obviously the recurring unit structure appearing within the brackets

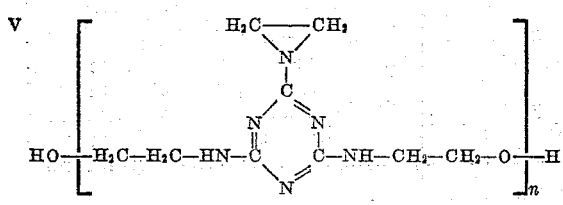

could be repeated $n$ times between the end of terminal s-triazinyl nuclei shown in the dimer of Equation IV.

The admixture of the acidic water and the polyethylene melamine may be effected in any suitable manner. One suitable method comprises adding a dilute aqueous solution of the acid, in increments, to an aqueous solution of the polyethylene melamine; or, an aqueous solution of the polyethylene melamine may be added to water containing the desired amount of acid. The temperature of admixture of the acidic water and polyethylene melamine may be considerably varied, as desired or as conditions may require, optimum results being obtained when the temperature is not less than about 10° C. and not higher than about 45° C. Normal room temperature conditions of 20°–30° C. generally are satisfactory for effecting reaction between the acidic water and the monomeric polyethylene melamine to produce the desired polymer of the desired molecular weight and particle size within a reasonable period of time.

The kind of acid or acidic substance which is employed does not appear to be critical. For economical and other reasons some are obviously preferred over others, among which may be mentioned acetic acid, phosphoric acid and hydrochloric acid. Examples of other organic and inorganic acids that can be used include: sulfuric, sulfonic, phosphinic, phosphonic, nitric, hydrobromic, sulfurous, phosphorous, alkyl phosphoric, oxalic, malonic, succinic, propionic, lactic, citric, hydrozyacetic, β-hydroxypropionic, butyric, valeric, chloroacetic, acrylic, crotonic, phthalic, etc., as well as mixtures of various organic acids, or of various inorganic acids, or of organic and inorganic acids. Acid salts can be used instead of the acids themselves, if desired, for instance sodium acid sulfate, monosodium phosphate, monosodium phthalate, etc., as well as mixtures of acid salts, or mixtures of an acid salt and an organic and/or inorganic acid.

The amount of acid employed will vary considerably depending upon the particular acid employed, polyethylene melamine employed, time, temperature and other conditions of reaction, method and rapidity of admixture, extent of polymerization desired and particle size and solubility characteristics of the polymer and other influencing factors. Ordinarily, however, the amount of acid employed corresponds to from 0.03 to 3 moles (about 0.03 to about 3 moles) thereof per mole of polyethylene melamine, that is, per mole of diethylene melamine, or triethylene melamine, or mixture of diethylene melamine and triethylene melamine in any proportions. Good results have been obtained using from about 0.06 to about 2.0 moles of acid, specifically acetic acid, hydrochloric acid and phosphoric acid, per mole of polyethylene melamine. The amount of acid employed and the time and method of admixture of the acidic water and polyethylene melamine obviously should be so correlated as to avoid gelation of the admixture.

The liquid compositions of this invention are especially suitable for use as textile-treating agents for improving the useful properties of such textiles as cotton, viscose rayons, wool, etc. For such applications, as well as for others, the polymer obtained by polymerizing the polyethylene melamine in acidic water advantageously constitutes from about 1% to about 30%, more particularly from about 2% to about 15%, by weight of the total amount of said polymer and of water which is present in the liquid composition. In general, the textiles are immersed in the liquid composition during the treating process, and the polyethylene melamine polymer ordinarily exhausts upon the textile in a percentage corresponding to or approximating the percentage of polymer which is present in the composition.

In order that those skilled in the art may better understand how our invention can be carried into effect, the following examples are given by way of illustration and not by way of limitation. All parts and percentages are by weight.

*Example 1*

A 5-gram sample of triethylene melamine is dissolved in 25 grams of water and titrated electrometrically with 0.5 N aqueous hydrochloric acid, using a total of 64 cc. of the latter. This corresponds to about 1.3 moles of acid per mole of triethylene melamine. From an initial pH of 8.5 the pH is decreased to 3.4 by this amount of acid. More detailed data are given below:

Cc. of 0.5 N HCl added: pH
- None _____ 8.5
- 10 _____ 8.0
- 15 _____ 7.3
- 20 _____ 6.45
- 25 _____ 5.1
- 28 _____ 5.05
- 30 _____ 4.9
- 32 _____ 4.8
- 35 _____ 4.75
- 40 _____ 4.55
- 45 _____ 4.3
- 49 _____ 4.0
- 55 _____ 3.8
- 60 _____ 3.65
- 64 _____ 3.4

Upon plotting the results (pH v. cc. of 0.5 N HCl), it is found that there is a sharp change in the inflection of the curve at a pH of 5.1, that is, after about 25 cc. of 0.5 N HCl have been added. This is indicative that the polyethylene melamine has undergone reaction. The theoretical "equivalence point" is 49 cc. of 0.5 N HCl (pH of 4.0).

The solution is filtered to remove any suspended or water-insoluble matter. The filtered solution is suitable for use as a beater additive in the formation of paper, thereby to obtain a paper having improved wet-strength characteristics as compared with similarly formed paper in which no triethylene melamine has been incorporated.

Example 2

Same as Example 1 with the exception that diethylene melamine is used instead of triethylene melamine. Similar end results are obtained.

Example 3

Two separate solutions are prepared, each by dissolving 10 grams of triethylene melamine in 50 grams of water. One solution (A) is titrated electrometrically with 0.5 N aqueous hydrochloric acid to a pH of 4.0. This corresponds to about 1.34 moles of acid per mole of triethylene melamine. More detailed data are given below:

Cc. of 0.5 N HCl added: pH
- None _____ 8.8
- 50 _____ 5.7
- 80 _____ 4.7
- 90 _____ 4.5
- 95 _____ 4.45
- 98 _____ 4.45
- 110 _____ 4.35
- 115 _____ 4.2
- 120 _____ 4.1
- 131 _____ 4.0

The other solution (B) of 10 grams of triethylene melamine dissolved in 50 grams of water is mixed with 98 cc. of 0.5 N aqueous hydrochloric acid, yielding a solution containing about 6.33% by weight of triethylene melamine and having a pH of 4.6. This corresponds to about 1.0 mole of acid per mole of triethylene melamine.

Both of the aforementioned solutions can be used directly, that is, without filtration, as beater additives in the formation of paper. Using solution (B) in an amount such that the amount of triethylene melamine present is equivalent to 3% by weight, based on the dry weight of the paper stock, a paper having a dry strength of 26 lbs. per inch and a wet strength of 2 lbs. per inch is obtained. Higher wet-strength papers can be produced by increasing the concentration of triethylene melamine employed and/or by employing other acid solutions (true solutions or colloidal solutions) of the polyethylene melamine, specifically triethylene melamine.

Example 4

A 10-gram sample of triethylene melamine is dissolved in 50 grams of water and titrated electrometrically with 0.52 N aqueous acetic acid solution, using a total of 149.5 cc. of the latter. This corresponds to about 1.58 moles of acid per mole of triethylene melamine. There is a sharp drop in pH with the addition of the first 5 cc. of acetic acid solution, after which the pH changes very gradually until the theoretical equivalence point is reached upon adding 98 cc. of reagent (pH of the solution after this amount of reagent has been added is 4.2). More detailed data are given below:

Cc. of 0.52 N acetic acid added: pH
- None _____ 8.5
- 5 _____ 5.3
- 10 _____ 5.2
- 20 _____ 4.85
- 30 _____ 4.75
- 40 _____ 4.6
- 50 _____ 4.45
- 60 _____ 4.35
- 70 _____ 4.3
- 80 _____ 4.25
- 90 _____ 4.2
- 100 _____ 4.18
- 110 _____ 4.15
- 120 _____ 4.12
- 130 _____ 4.09
- 140 _____ 4.05
- 145 _____ 4.03
- 149.5 _____ 4.0

This solution has good storage stability and is suitable for use as a finishing agent for viscose rayons in the form of staple fibers or continuous filament yarns, or in treating fabrics made therefrom, in order to impart improved water-repellency thereto and otherwise to improve their properties.

Example 5

A 10-gram sample of triethylene melamine is dissolved in 50 grams of water and titrated electrometrically with an aqueous phosphoric acid solution containing 32.66 grams of 85% phosphoric acid per liter of solution. More detailed data are given below:

Cc. of phosphoric acid solution added: pH
- None _____ 8.9
- 1 _____ 6.4
- 2 _____ 6.25
- 5 _____ 5.8

When another 5 cc. of acid is added, the solution gels. This gel will not disperse in the water.

Example 6

Example 5 is repeated, but using an aqueous phosphoric acid solution containing 16.33 grams of 85% phosphoric acid per liter of solution. More detailed data are given below:

Cc. of phosphoric acid solution added: pH
- None _____ 8.7
- 5 _____ 6.1
- 10 _____ 5.85
- 15 _____ 5.65
- 20 _____ 5.3

When another 2.5 cc. of acid is added, the solution gels. This gel will not disperse in water.

Example 7

Example 6 is repeated using, instead of the triethylene melamine solution, a solution of 10 grams of diethylene melamine dissolved in 50 grams of water. Similar results are obtained.

The liquid compositions of Examples 5, 6 and 7 are suitable for such uses as have been mentioned hereinbefore, for instance under Examples 1, 3 and 4.

We claim:

1. A liquid composition comprising, by weight, (1) a major proportion of water and (2) a minor proportion of a polymer obtained by maintaining (a) a polyethylene melamine which is a polyamino-s-triazine wherein at least two of the amino nitrogen atoms each has one ethylene group attached thereto instead of the two hydrogen atoms in contact with (b) acidic water until the said polyethylene melamine has polymerized to the desired degree.

2. A liquid composition as in claim 1 wherein the acidic water in which the polyethylene melamine is polymerized contains an acid in an amount corresponding to from 0.03 to 3 moles thereof per mole of polyethylene melamine.

3. A liquid composition as in claim 1 wherein the polyethylene melamine of (a) is diethylene melamine, the formula for which is

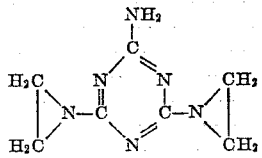

4. A liquid composition as in claim 1 wherein the polyethylene melamine of (a) is triethylene melamine, the formula for which is

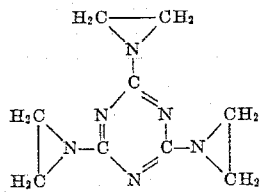

5. A liquid composition as in claim 1 wherein the acid employed in producing the acidic water of (b) is hydrochloric acid.

6. A liquid composition as in claim 1 wherein the acid employed in producing the acidic water of (b) is phosphoric acid.

7. A liquid composition as in claim 1 wherein the acid employed in producing the acidic water of (b) is acetic acid.

8. A liquid composition as in claim 1 wherein the polymer of (2) constitutes from about 1% to about 30% by weight of the total of (1) and (2).

9. An aqueous hydrochloric acid solution of a polymer obtained by contacting triethylene melamine dissolved in water while hydrochloric acid is admixed therewith, said polymer constituting from about 1% to about 30% by weight of the said hydrochloric acid solution.

10. An aqueous phosphoric acid solution of a polymer obtained by contacting triethylene melamine dissolved in water while phosphoric acid is admixed therewith, said polymer constituting from about 1% to about 30% by weight of the said phosphoric acid solution.

11. An aqueous acetic acid solution of a polymer obtained by contacting triethylene melamine dissolved in water while acetic acid is admixed therewith, said polymer constituting from about 1% to about 30% by weight of the said acetic acid solution.

12. The method which comprises contacting (1) a polyethylene melamine which is a polyamino-s-triazine wherein at least two of the amino nitrogen atoms each has one ethylene group attached thereto instead of the two hydrogen atoms with (2) acidic water, and maintaining the said polyethylene melamine of (1) in contact with the acidic water of (2) until the polyethylene melamine has polymerized to the desired degree.

13. A method as in claim 12 wherein the acid employed in producing the acidic water is hydrochloric acid.

14. A method as in claim 12 wherein the acid employed in producing the acidic water is phosphoric acid.

15. A method as in claim 12 wherein the acid employed in producing the acidic water is acetic acid.

16. A method as in claim 12 wherein the polyethylene melamine is triethylene melamine and the acidic water contains acid in an amount corresponding to from 0.03 to 3 moles thereof per mole of triethylene melamine.

17. The method which comprises admixing (1) a polyethylene melamine which is a polyamino-s-triazine wherein at least two of the amino nitrogen atoms each has one ethylene group attached thereto instead of the two hydrogen atoms and (2) acidic water, and maintaining the resulting admixture at a temperature within the range of about 10° C. to about 45° C. until the polyethylene melamine has polymerized to a polymer of the desired molecular weight and particle size.

References Cited in the file of this patent

German Synthetic Fiber Developments, by Smith, published 1946 by Textile Research Institute Inc., New York, N. Y., page 876.